United States Patent [19]

Wildeman et al.

[11] Patent Number: 4,721,531

[45] Date of Patent: Jan. 26, 1988

[54] PIGMENT DISPERSIONS EXHIBITING IMPROVED COMPATIBILITY IN POLYURETHANE SYSTEMS

[75] Inventors: George F. Wildeman, Ashtabula; Allen J. Virant, Geneva, both of Ohio

[73] Assignee: Plasticolors, Inc., Ashtabula, Ohio

[21] Appl. No.: 883,329

[22] Filed: Jul. 8, 1986

[51] Int. Cl.$^4$ ............................................. C09C 3/00
[52] U.S. Cl. ................................. 106/309; 106/288 Q; 106/308 N; 525/440
[58] Field of Search ............... 106/288 Q, 308 N, 309; 525/440, 448

[56] References Cited

U.S. PATENT DOCUMENTS

| | | | |
|---|---|---|---|
| 3,004,896 | 10/1961 | Heller et al. | 167/90 |
| 3,330,859 | 7/1967 | Dexter et al. | 260/473 |
| 3,644,482 | 2/1972 | Dexter et al. | 260/473 |
| 3,799,990 | 3/1974 | Nast et al. | 260/613 |
| 4,021,471 | 5/1977 | Virgillio et al. | 260/471 |
| 4,085,062 | 4/1978 | Virgillio et al. | 252/300 |
| 4,208,522 | 6/1980 | Ramey et al. | 544/385 |
| 4,315,848 | 2/1982 | Dexter et al. | 260/45.8 NT |
| 4,332,354 | 6/1982 | de Monterey et al. | 106/309 |
| 4,510,302 | 4/1985 | Kolb et al. | 526/264 |
| 4,511,596 | 4/1985 | Berner | 427/44 |
| 4,524,165 | 6/1985 | Musser et al. | 525/448 |
| 4,533,703 | 8/1985 | Kordomenos et al. | 525/440 |
| 4,533,704 | 8/1985 | Alexander et al. | 525/440 |

*Primary Examiner*—Prince E. Willis
*Assistant Examiner*—Willie J. Thompson
*Attorney, Agent, or Firm*—Renner, Otto, Boisselle & Lyon

[57] ABSTRACT

A method is described for improving the compatibility of pigments and, optionally, stabilizers in the polyol-containing component of two- and three-component polyurethane systems. The method comprises (A) preparing a dispersion comprising at least one pigment in at least one glycol, and (B) blending said dispersion with the polyol component.

In a preferred embodiment, the glycol of the dispersion is identical to the glycol used as the chain extender in the polyol component of the urethane system. The pigment dispersions also may contain at least one stabilizer for the urethane including heat stabilizers and ultraviolet light stabilizers. Compositions are described which comprise at least one pigment and at least one heat and/or ultraviolet light stabilizing compound dispersed in a glycol. Such dispersions exhibit improved compatibility with the polyol component thereby minimizing settling of the pigment resulting in a reduction in the clogging of filters used in the urethane reaction. The improved compatibility also results in the reduction or elimination of color streaking in the urethane product.

26 Claims, No Drawings

PIGMENT DISPERSIONS EXHIBITING IMPROVED COMPATIBILITY IN POLYURETHANE SYSTEMS

TECHNICAL FIELD OF THE INVENTION

This invention relates to a method for improving the compatibility of pigments in the polyol-containing component of two- or three-component polyurethane systems. The invention also relates to pigment dispersions including pigment dispersions containing at least one ultraviolet stabilizer to improve the resistance of the urethane polymers to deterioration caused by ultraviolet light.

BACKGROUND OF THE INVENTION

Polyurethanes are produced by a chemical reaction between polyols and polyisocyanates, generally in the presence of auxiliary materials such as surfactants, stabilizers, blowing agents, etc., which are added to control the process and the characteristics of the resultant product, generally a foam. The polyols used in the formation of polyurethanes are compounds which contain hydroxyl groups which can react with isocyanates to form polyurethane products. There are two principal types of polyols utilized in the industry: polyester polyols and polyether polyols. The more common and most popular the the polyethers which are polymerization products of epoxides with alcohol to form ether groups (—C—O—C—) in the molecules. The polyethers synthesized in this manner may be linear, long chain polyethers which are characterized by a relatively low viscosity, or branched, short-chain polyethers which are characterized as having higher viscosities.

The polyester polyols which have been utilized in the formation of urethane polymers are obtained by the reaction of a dicarboxylic acid such as adipic acid, phthalic anhydride, dimerized linoleic acid, etc. with simple glycols and triols. The glycols used in the formation of the polyester polyols include ethylene glycol, propylene glycol, 1,3-butanediol, 1,4-butanediol, diethylene glycol, and mixtures thereof. The triols may be glycerine, 2,6-hexanetriol, trimethylolpropane and trimethylolethane.

While it is theoretically possible to produce polyurethanes from polyols and isocyanates without the use of auxiliary materials, some of the reactions take place only very slowly and often produce polyurethanes with undesirable or unusual characteristics. Industrial scale production requires the use of auxiliary materials blended in the polyol to control the progress of the reaction and to produce polyurethanes having particular properties.

Chain extenders may be included in the urethane formulations, and these components generally are glycols. Various glycols which have been used as chain extenders include ethylene glycol, diethylene glycol, 1,6-hexanediol and 1,4-butanediol. One of the difficulties including certain of the glycol chain extenders such as 1,4-butanediol is that they are incompatible with polyethers and polyesters. Accordingly, mixtures of polyethers and polyesters with 1,4-butanediol must be thoroughly homogenized prior to use.

Catalysts are used to accelerate the reaction between polyols and isocyanates. Amine and tin catalysts, and mixtures thereof have been used in urethane formulations.

In commercial production of urethanes, the procedure utilizes two liquid components which are fully compounded and delivered to the converter by the chemical manufacturer. These two components are designated in the industry as component (A), the isocyanate component and, component (B), the resin component. The resin component (B) generally contains the backbone polyol (polyether polyol or polyester polyol), chain extender, catalyst and blowing agent. Pigment and pigment dispersions also are included in or added to component (B) prior to the reaction with the polyisocyanate (component (A)). Obviously, it is desirable that the pigment or pigment dispersion be compatible with the resin component (B) so that the pigment will be uniformly dispersed in component (B). If the pigment is not compatible with component (B), then settling of the pigment and clogging of filters results.

In addition to the above materials, component (B) also may include stabilizers such as thermal and light stabilizers including ultraviolet stabilizers and antioxidants. These stabilizers also must be compatible with the materials in resin component (B).

SUMMARY OF THE INVENTION

A method is described for improving the compatibility of pigments and, optionally, stabilizers in the polyol-containing component of two- or three-component polyurethane systems. The method comprises (A) preparing a dispersion comprising at least one pigment in at least one glycol, and (B) blending said dispersion with the polyol component.

In a preferred embodiment, the glycol of the dispersion is identical to the glycol used as the chain extender in the polyol component of the urethane system. The pigment dispersions also may contain at least one stabilizer for the urethane including heat stabilizers and ultraviolet light stabilizers. Compositions are described which comprise at least one pigment and at least one heat and/or ultraviolet light stabilizing compound dispersed in a glycol. Such dispersions exhibit improved compatibility with the polyol component thereby minimizing settling or agglomeration of the pigment resulting in a reduction in the clogging of filters used in the urethane processing equipment, and also results in the reduction or elimination of color streaking in the urethane product.

DESCRIPTION OF THE PREFERRED EMBODIMENTS

The present invention relates to a method of improving the compatibility of pigments in the polyol-containing component (generally referred to in the industry and in the specification as component (B) of two- and three-component polyurethane systems). Component (A) of the polyurethane system is the polyisocyanate.

In one embodiment, the process of the present invention comprises (A) preparing a dispersion comprising at least one pigment in at least one glycol, and (B) blending said dispersion with the polyol-containing component of the polyurethane system.

The pigments may be organic pigments and/or inorganic pigments. The amount of pigment included in dispersion generally will be from about 10% to about 75% by weight of the dispersion.

The term "pigment" as used in the specification and claims also includes some materials which are some-times referred to as fillers and polymers, and these include metal powders, metal oxides and other inorganic compounds such as barium sulfate. Metal powders such as aluminum or bronze may be utilized as pigments to produce desired colors as well as provide other properties including improved thermal properties and electrical conductivity. Among the metallic oxides which can be utilized as pigments are zinc oxide, aluminum oxide, magnesium oxide, iron oxide red, iron oxide yellow, chrome oxide green, and titanium oxide white. Other inorganic pigments which are utilized to provide the desired colors to polyurethanes include zinc sulfide, cadmium sulfoselenide, cadmium mercury, zinc chromate, cobalt aluminate, chrome cobalt-alumina, ultramarine blue and lead carbonate.

A wide variety of organic pigments can be utilized as colorants in polymeric materials, and any of the known organic pigment colorants can be utilized in the present invention. Some typical organic pigment colorants include Para Red, Lithol Rubine, Helio Bordeaux, Thio Indigo, Thio Indigoid, Toluidine, Dioxazine, Red Lake C and Red Lake R, Pyrazolone Red, Anthraquinone, Isoindolinone, Perylene, Benzidene Yellow Anilide, Benzidene Yellow Xylidide, Benzidene Yellow Anisidide, Flavanthrone, Phthalocyanine Blue, Phthalocyanine Green, Pigment Green B, Carbon Black, Bone Black, Azo, Aniline Black, etc.

The glycols which may be utilized to form the dispersion of the present invention may be any low molecular weight glycol including ethylene glycol, diethylene glycol, 1,2-propanediol, 1,3-propanediol, 1,4-butanediol or 1,6-hexanediol. Mixtures of these glycols may be utilized. Generally, it is preferred that the glycol used in the formation of the pigment dispersion be the same as the glycol used as the chain extender in the polyol component (B).

The pigment dispersions prepared in accordance with the process of the present invention also may contain one or more stabilizers for the polyurethane. Any of the light stabilizers, UV absorbers and/or antioxidants normally used in the polyurethane systems can be incorporated into the pigment dispersions of the present invention. Thus, a variety of ultraviolet absorbers including benzotriazole derivatives, hydroxy benzophenones, esters of benzoic acids, oxalic acid, diamides, etc. may be included in the pigment dispersions. Various benzotriazole derivatives useful as ultraviolet absorbers and stabilizers are described in U.S. Pat. Nos. 3,004,896; 4,315,848; 4,511,596; and 4,524,165. Those portions of these patents which describe the various benzotriazole derivatives are herein incorporation by reference.

Other ultraviolet absorbers including hydroxybenzophenones, esters of benzoic acids, oxalic acid diamides, etc., are described in U.S. Pat. No. 4,511,596, and the disclosure of this patent also is incorporated by reference for its teaching of such ultraviolet absorbers which can be incorporated in the pigment dispersions of the present invention.

In a preferred embodiment of the present invention, the pigment dispersions which are compatible with the polyol-containing component of a two-component polyurethane system will contain (1) hindered amine light stabilizers, (2) substituted formamidines as described more fully below, (3) hindered phenolic antioxidants, or mixtures of two or more of stabilizers (1), (2) and (3). The amounts of the heat and/or ultraviolet stabilizers incorporated into the pigments of the present invention will be an amount which will be sufficient when blended into the polyol component to provide the desired stabilization to the polyurethane products.

Stabilizer (1): Hindered Amine Light Stabilizer

The pigment dispersions of the present invention may contain at least one hindered amine light stabilizer. A variety of hindered amine light stabilizers suggest in the prior art as ultraviolet light stabilizers for organic materials can be utilized in the dispersions of the present invention.

In one embodiment, the hindered amine light stabilizer (1) can be characterized by the general formulae

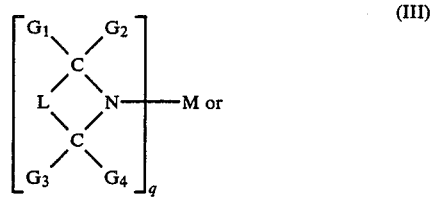

(III)

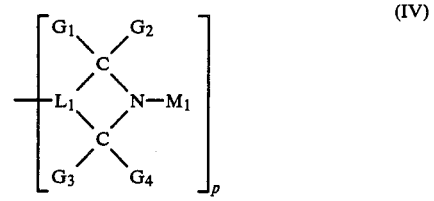

(IV)

wherein q is 1 or 2, p is 2 to 14, $G_1$, $G_2$, $G_3$ and $G_4$ are independently alkyl; or $G_1$ and $G_3$ together are alkylene or each are carboalkoxy or carbophenethoxy; or $G_1$ and $G_2$ or $G_3$ and $G_4$, independently of one another, together are alkylene or azaalkylene; if q is 1, M is hydrogen, hydroxyl, oxyl, optionally substituted alkyl, alkenyl, alkynyl, aralkyl, alkanoyl, alkenoyl, benzoyl, glycidyl or —$CH_2CHOHZ$ where Z is hydrogen, methyl or phenyl; if q is 2, M is alkylene, alkenylene, alkynylene, arylenedialkylene, the group —$(CH_2)_2OOCR_{1-8}COO(CH_2)_2$— or the group —$CH_2OOOCR_{1-9}COOCH_2$— where $R_{18}$ is alkylene and $R_{19}$ is alkylene, xylylene or cyclohexylene; $M_1$ has the meaning of M where q is 1; L is a divalent organic group which supplements the N-containing ring to form a 5 to 7 membered ring, or is two monovalent organic groups; and $L_1$ is a divalent organic group which supplements the N-containing ring to form a 5 to 7 membered ring and which additionally provides a linking group to other hindered amine moieties.

More particularly, the hindered amine light stabilizers which have found utility in the dispersions of the present invention are derivatives of 2,2,6,6-tetraalkylpiperadines which contain a group of the formula

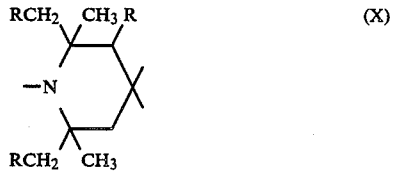

(X)

wherein R is hydrogen or methyl.

The hindered amine light stabilizers useful in the dispersions of the present invention include particularly the following types of compounds:

(1) light stabilizers of formula

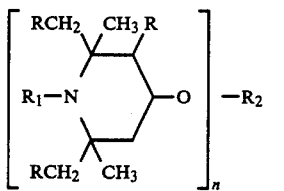

(V)

in which n is a number from 1 to 4 inclusive, preferably 1 or 2; R is hydrogen or lower alkyl; $R_1$ is hydrogen, oxyl, $C_{1-18}$ alkyl, $C_{3-8}$ alkenyl, $C_{3-8}$ alkynyl, $C_{7-12}$ aralkyl, $C_{1-8}$ alkanoyl, $C_{3-5}$ alkenoyl, glycidyl, a group —$CH_2CH(OH)$—Z wherein Z is hydrogen, methyl or phenyl, with $R_1$ preferably being hydrogen, $C_{1-12}$ alkyl, allyl, benzyl, acetyl or acryloyl; and $R_2$ when n is 1 is hydrogen, $C_{1-18}$ alkyl optionally interrupted by one or more oxygen atoms, cyanoethyl, benzyl, glycidyl, a monovalent radical of an aliphatic, cycloaliphatic, araliphatic or aromatic carboxylic acid, or a carbamic acid or of a phosphorus-containing acid, or a monovalent silyl group, preferably a group of an aliphatic carboxylic acid having 2 to 18 carbon atoms, of a cycloaliphatic carboxylic acid having 5 to 12 carbon atoms or of an aromatic carboxylic acid having 7 to 15 carbon atoms; $R_2$ when n is 2 is $C_{1-2}$ alkylene, $C_{4-12}$ alkenylene, xylylene, a bivalent group of an aliphatic, cycloaliphatic, araliphatic or aromatic dicarboxylic acid, of dicarbamic acid or of a phosphorus-containing acid, or a bivalent silyl group, preferably a group of an aliphatic dicarboxylic acid having 2 to 36 carbon atoms, of a cycloaliphatic or aromatic dicarboxylic acid having 8 to 14 carbon atoms, or of an aliphatic, cycloaliphatic or aromatic dicarbamic acid having 8 to 14 carbon atoms; $R_2$ when n is 3 is a trivalent group of an aliphatic, cycloaliphatic or aromatic tricarboxylic acid, of an aromatic tricarbamic acid or of a phosphorus-containing acid, or a trivalent silyl group; and $R_2$ when n is 4 is a tetravalent group of an aliphatic, cycloaliphatic or aromatic tetracarboxylic acid.

If any of the substituents are alkyl groups containing from 1 to 12 carbon atoms, they are exemplified by methyl, ethyl, n-propyl, n-butyl, sec-butyl, tert-butyl, n-hexyl, n-octyl, 2-ethylhexyl, n-nonyl, n-decyl, n-undecyl or n-dodecyl.

When $R_1$ or $R_2$ contain from 1 to about 18 carbon atoms, they can be any of the groups given above, and furthermore, may be n-tridecyl, n-tetradecyl, n-hexadecyl or n-octadecyl. When $R_1$ is an alkenyl group containing from about 3 to about 8 carbon atoms, such group is exemplified by 1-propenyl, allyl, methallyl, 2-butenyl, 2-pentenyl, 2-hexenyl, 2-octenyl, or 4-tert-butyl-2-butenyl. An example of an $R_1$ alkynyl group is propargyl. Examples of aralkyl groups $R_1$ include benzyl, phenethyl, etc. As mentioned, $R_1$ also may be an alkanoyl group containing from 1 to about 8 carbon atoms, and examples of such groups include formyl, propionyl, butyryl, octanoyl and acetyl. $R_2$ also may be a monovalent group of a carboxylic acid such as a group derived from acetic acid, stearic acid, salicyclic acid, methacrylic acid, maleic acid, benzoic acid and beta-(3,5-di-tert-butyl-4-hydroxyphenyl)propionic acid.

If $R_2$ is a bivalent group of a dicarboxylic acid, it may be, for example, a group of adipic acid, subaric acid, sebacic acid, phthalic acid, dibutylmalonic acid, dibenzyl malonic acid, or butyl-(3,5-ditert-butyl-4-hydroxybenzyl)malonic acid, or bicycloheptenedicarboxylic acid. $R_2$ also may be a trivalent group of a tricarboxylic acid such as a group of trimellitic acid or of nitrillotriacetic acid.

The following compounds are examples of polyalkyl piperidine light stabilizers of the type represented by Formula V:

A-1 4-hydroxy-2,2,6,6-tetramethylpiperidine
A-2 1-allyl-4-hydroxy-2,2,6,6-tetramethylpiperidine
A-3 1-benzyl-4-hydroxy-2,2,6,6-tetramethylpiperidine
A-4 1-(4-tert-butyl-2-butenyl)-4-hydroxy-2,2,6,6-tetramethylpiperidine
A-5 4-stearoyloxy-2,2,6,6-tetramethylpiperidine
A-6 1-ethyl-4-salicyloyloxy-2,2,6,6-tetramethylpiperidine
A-7 4-methacryloyloxy-1,2,2,6,6-pentamethylpiperidine
A-8 1,2,2,6,6-pentamethylpiperidin-4-yl-beta-(3,5-di-tert-butyl-4-hydroxyphenyl)-propionate
A-9 1-benzyl-2,2,6,6-tetramethyl-4-piperidinylmaleinate
A-10 (di-2,2,6,6-tetramethylpiperidin-4-yl)-adipate
A-11 (di-2,2,6,6-tetramethylpiperidin-4-yl)-sebacate
A-12 (di-1,2,3,6-tetramethyl-2,6-diethyl-piperidin-4-yl)-sebacate
A-13 (di-1-allyl-2,2,6,6-tetramethyl-piperidin-4-yl)-phthalate
A-14 1-acetyl-2,2,6,6-tetramethylpiperidin-4-yl-acetate
A-15 trimellitic acid-tri-(2,2,6,6-tetramethylpiperidin-4-yl)ester
A-16 1-acryloyl-4-benzyloxy-2,2,6,6-tetramethylpiperidine
A-17 dibutyl-malonic acid-di-(1,2,2,6,6-pentamethyl-piperidin-4-yl)-ester
A-17 dibenzyl-malonic aicd-di-(1,2,3,6-tetramethyl-2,6-diethyl-piperidin-4-yl)-ester
A-19 dimethyl-bis-(2,2,6,6-tetramethylpiperidin-4-oxy)-silane
A-20 tris-(1-propyl-2,2,6,6-tetramethylpiperidin-4-yl)-phosphite
A-21 tris-(1-propyl-2,2,6,6-tetramethylpiperidin-4-yl)-phosphate (2) Hindered amine light stabilizers characterized by Formula VI:

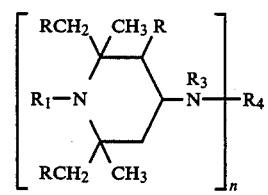

(VI)

in which n is the number 1 or 2; R is hydrogen or methyl; $R_1$ is hydrogen, oxyl, $C_{1-18}$ alkyl, $C_{3-8}$ alkenyl, $C_{3-8}$ alkynyl, $C_{7-12}$ aralkyl, $C_{1-8}$ alkanoyl or $C_{3-5}$ alkenoyl; $R_3$ is hydrogen, $C_{1-12}$ alkyl, $C_{5-7}$ cycloalkyl, $C_{7-8}$ aralkyl, $C_{2-18}$ alkanoyl, $C_{3-5}$ alkenoyl or benzoyl; and $R_4$ when n is 1 is hydrogen, $C_{1-18}$ alkyl, $C_{5-7}$ cycloalkyl, $C_{2-8}$ alkenyl which is unsubstituted or substituted by a cyano, carbonyl or carbamide group, or it is glycidyl, a group of the formula —$CH_2$—$CH(OH)$—Z or of the formula —CON—H—Z wherein Z is hydrogen, methyl or phenyl; or $R_4$ when n is 2 is $C_{2-12}$ alkylene, $C_{6-12}$ arylene, xylylene, a —$CH_2$—$CH(OH)$—$CH_2$— group or a group —$CH_2$—$CH(OH)$—$CH_2$—O—X—O—$CH_2$—$CH(OH)$—$CH_2$— wherein X is $C_{2-10}$ alkylene, $C_{6-15}$ arylene or $C_{6-12}$ cycloalkylene; or, provided that $R_3$ is not alkanoyl, alkenoyl or benzoyl, $R_4$ can also be a bivalent group of an aliphatic, cycloaliphatic or aromatic dicarboxylic acid or dicarbamic acid, or can also be the group —CO—; or R₃ and R₄ together when n is 1 can be the cyclic group of an aliphatic or aromatic 1,2- or 1,3-dicarboxylic acid.

If any of these groups are alkyl groups containing from 1 to about 18 carbon atoms, they are are as already defined above with respect to Formula V. An example of a cycloalkyl group containing from about 5 to about 7 carbon atoms is cyclohexane, and examples of aralkyl groups, R₃ containing from about 7 to about 8 carbon atoms include phenethyl and benzyl. Examples of R₃ groups when R₃ is an alkanoyl group containing from about 2 to about 18 carbon atoms include, for example, propionyl buteryl, octanoyl, dodecanoyl, hexadecanoyl, octadecanoyl, and acetyl.

R₄ is Formula VI is an alkenyl group containing from about 2 to about 8 carbon atoms which may be further substituted by a cyano, carbonyl or carbamide group. R₄ is exemplified by 1-propionyl, allyl, methallyl, 2-butenyl, 2-pentenyl, 2-hexenyl, 2-octenyl, 2,2-dicyanovinyl, 1-methyl-2-cyano-2-methoxy carbonylvinyl, and 2,2-diacetylaminovinyl. Examples of alkylene groups containing from about 2 to about 12 carbon atoms include, for example, ethylene, propylene, 2,2-dimethylpropylene, tetramethylene, hexamethylene, octamethylene, decamethylene, or dodecamethylene. Examples of arylene groups containing from 6 to 15 carbon atoms include o-, m- or p-phenylene, 1,4-naphthylene and 4,4'-diphenylene.

The following compounds are examples of polyalkyl-piperidine light stabilizers of the class represented by Formula VI.

A-22 N,N'-bis-(2,2,6,6-tetramethylpiperidin-4-yl)-hexamethylene-1,6-diamine

A-23 N,N'-bis-(2,2,6,6-tetramethylpiperidin-4-yl)-hexamethylene,1,6-diacetamide

A-24 1-acetyl-4-(N-cyclohexylacetamide)-2,2,6,6-tetramethyl-piperidine

A-25 4-benzylamino-2,2,6,6-tetramethylpiperidine

A-26 N,N'-bis-(2,2,6,6-tetramethylpiperidin-4-yl)-N,N'-dibutyl-adipamide

A-27 N,N'-bis-(2,2,6,6-tetramethylpiperidin-4-yl)-N,N'-dicyclohexyl-(2-hydroxypropylene)

A-28 N,N'-bis-(2,2,6,6-tetramethylpiperidin-4-yl)-p-xylylene-diamine

A-29 4-(bis-2-hydroxyethyl)-amino-1,2,2,6,6-pentamethylpiperidine

A-30 4-methacrylamide-1,2,2,6,6-pentamethylpiperidine

A-31 alpha-cyano-beta-methyl-beta-[N-(2,2,6,6-tetramethylpiperidin-4-yl)]-amino-acrylic acid methyl ester The hindered amine light stabilizers useful as stabilizer (1) in the present invention also may be substituted piperizinediones characterized by the following Formula VII

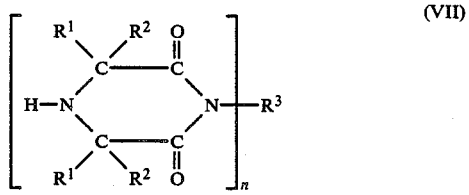

(VII)

wherein R¹ and R² are each independently methyl or ethyl or together with the carbon to which they are bound from a cyclopentyl or cyclohexyl ring which is unsubstituted or substituted with a methyl group; n is an integer of from 1 to 3; when n is 1, R³ is an alkyl group of from 1 to about 20 carbon atoms or a benzyl group; when n is 2, R³ is an alkylene group of from 1 to about 20 carbon atoms, a p-xylylene group or an alkyl-substituted p-xylylene group of the formula

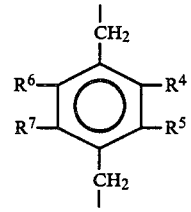

wherein R⁴, R⁵, R⁶ and R⁷ is hydrogen or lower alkyl group containing from 1 to 5 carbon atoms; when n is 3, R³ is a 1,3,5-mesitylene group or a 2,4,6-alkyl substituted mesitylene group or a 2,4,6-alkyl-substituted mesitylene group of the formula

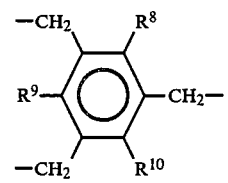

wherein R⁸, R⁹ and R¹⁰ are hydrogen or lower alkyl, containing from 1 to about 5 carbon atoms.

The hindered amine light stabilizers represented by Formula VII can be prepared by reacting a substituted piperizinedione (such as a dione represented by Formula VII wherein n is 0 and R₃ is hydrogen) with an organic mono-, di- or tri-halo compound. The alkylation reaction is carried out by first preparing the alkali or alkaline earth metal salt of the starting piperizine dione and then reacting the salt with the appropriate organic halide in a solvent such as dimethyl formamide, isopropanol or acetone at about 75° C. Examples of organic halides which can be reacted with the starting piperazinedione include organic monohalide such as methyliodide, ethyl chloride, propyl chloride, pentyl bromide, dodecyl bromide, etc.; organic dihalides such as methylene bromide, dibromoethane, 1,3-dibromobutane, 1,12-dichlorododecane, etc.; and organic trihalide such as alpha,alpha',alpha"-trichloromesitylene. The preferred organic monohalides contain from about 6 to about 18 carbon atoms, and the preferred dihalides contain from about 2 to about 12 carbon atoms.

The preparation of substituted piperazinediones represented by Formula VII which are useful as hindered amine light stabilizers in the dispersions and urethane compositions of the present invention are known in the art and have been described in, for example, U.S. Pat. No. 4,208,522. The disclosure of U.S. Pat. No. 4,208,522 relating to the description of and preparation of hindered amine light stabilizers such as those represented by Formula VII is herein incorporated by reference.

Other hindered amine light stabilizers of the type characterized broadly by Formulae III, IV and X above can be utilized as component (A) in the present invention. Further examples of such amine stabilizers is believed unnecessary in view of the many discussions, descriptions and examples contained in the prior art such as, for example, in U.S. Pat. Nos. 4,315,848; 4,511,596; and 4,524,165. The disclosures of these patents relating to various examples of hindered amine light stabilizers is herein incorporated by reference.

A number of hindered amine light stabilizers coming within the definition of Formulae III–VII and X are available commercially such as from the Ciba-Geigy Corporation, and specific examples include "Tinuvin 770" which is identified as bis-(2,2,6,6-tetramethyl-4-piperidyl)-sebacate, "Tinuvin 765" which is identified as bis-(1,2,2,6,6-pentamethyl-4-piperidinyl)-sebacate, "Tinuvin 144" which is bis-(1,2,2,6,6-pentamethyl-4-piperidinyl)-2-n-butyl-2-(3',5'-di-tert-butyl-4-hydroxybenzyl) malonate, and "Tinuvin 622" which is a polyester of succinic acid and N-beta-hydroxyethyl-2,2,6,6-tetramethyl-4-hydroxy-piperidine.

STABILIZER (2): FORMAMIDINE COMPOUNDS

The dispersions of this invention also may contain at least one substituted formamidine ultraviolet absorber or stabilizer. In one embodiment, the substituted formamidines are characterized by the general structure

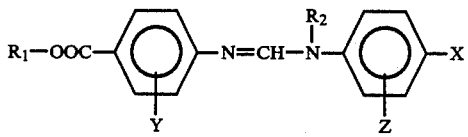
(I)

wherein $R_1$ is an alkyl group containing 1 to about 5 carbon atoms; Y is a H, OH, Cl or an alkoxy group; $R_2$ is a phenyl group or an alkyl group containing 1 to about 9 carbon atoms; X is selected from the group consisting of H, carboalkoxy, alkoxy, alkyl, dialkylamino and halogen; and Z is selected from the group consisting of H, alkoxy and halogen.

The substituted formamidines of the present invention are prepared by known procedures, the method chosen being dependent upon the available starting material.

One method utilizes as intermediates, the formimidates of the general formula

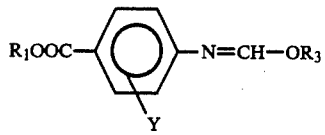
(IA)

wherein $R_1$ and Y are as defined previously and $R_3$ is an alkyl group of from 1 to about 5 carbon atoms. The formamidates, IA, are prepared by reacting the corresponding 4-aminobenzoate with a trialkyl orthoformate as illustrated below.

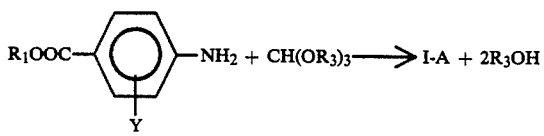

The reaction is effected by heating the reactants from 80° C. to 200° C., and the preferred temperature range is 130° C. to 160° C. The preferred procedure is to remove the alcohol which is formed during the reaction. The reaction is completed when no more alcohol is produced. Any trialkylorthoformate may be used but it is preferred to use the commercially available triethyl or trimethyl orthoformates.

The formamidines I also can be prepared by reacting the formimidates IA with N-alkylanilines as illustrated by the following reaction: I, IA, X, Z, $R_2$, and $R_3$ being as previously defined.

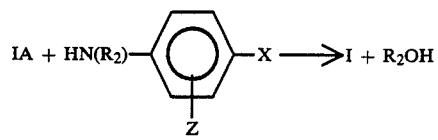

Reaction is effected by heating the reactants from 80° C. to 250° C., the preferred temperature range being 170° C. to 210° C. A preferred procedure is to remove the alcohol which is formed during the reaction. The reaction is completed when no more alcohol is produced.

The N-alkylanilines, can be prepared by methods known in the art. The N-alkylaniles, can be prepared, for example, from the corresponding anilines. Any of the methods known in the art for monoacylating primary amines, alkylating amides and hydrolyzing amides can be used in the preparation of the desired N-alkylanilines.

Another method for preparing the formamidines is by the reaction of an aminobenzoate with a formamide in the presence of a suitable catalyst such as phosphorus pentachloride to form the formamidines of structure I.

Specific examples of formamidines useful as stabilizer (2) are as follows:

B-1 N'-(4-Ethoxycarbonylphenyl)-N-methyl-N-phenylformamidine

B-2 N'-(4-Ethoxycarbonylphenyl)-N-ethyl-N-phenylformamidine

B-3 N'-(4-Ethoxycarbonylphenyl)-N-(4-methoxyphenyl)-N-methylformamidine

B-4 N,N'-Bis(4-Ethoxycarbonylphenyl)-N-methylformamidine

B-5 N-(4-Dimethylaminophenyl)-N'-(4-ethoxy-carbonylphenyl)-N-methylformamidine

B-6 N'-(4-Ethoxycarbonylphenyl)-N-(2-methoxyphenyl)-N-methylformamidine

B-7 N'-(4-Ethoxycarbonylphenyl)-N-(3,4-dichlorophenyl)-N-methylformamidine

B-8 N-(4-Butoxycarbonylphenyl)-N'-(4-ethoxycarbonylphenyl)-N-methylformamidine

B-9 N'-(4-Butoxycarbonylphenyl)-N-methyl-N-phenylformamidine

B-10 N'-(3-Hydroxy-4-methoxycarbonylphenyl)-N-methyl-N-phenylformamidine

B-11 N-Butyl-N-phenyl-N'-(4-ethoxycarbonylphenyl)-formamidine

B-12 N'-(4-Ethoxycarbonylphenyl)-N-(n-octyl)-N-phenylformamidine

B-13 N,N-Diphenyl-N'-(4-ethoxycarbonylphenyl)formamidine

B-14 N'-(4-Ethoxycarbonyl-3-methoxyphenyl)-N'-methyl-N-phenylformamidine

B-15 N'-(4-Isopropoxycarbonylphenyl)-N-methyl-N-phenylformamidine

B-16 N'-(4-Ethoxycarbonylphenyl)-N-methyl-N-(p-ethylophenylformamidine

B-17 N'-(2-Chloro-4-methoxycarbonylphenyl)-N-methyl-N-phenylformamidine

The following examples are presented to provide a more detailed description of the preparation of substituted formamidines useful as stabilizer (2) in the present invention. Unless otherwise indicated in the examples and elsewhere in the specification and claims, all parts and percentages are by weight and all temperatures are in degrees centigrade.

EXAMPLE B-1

Preparation of N-(p-ethoxycarbonylphenyl)-N'-methyl-N'-phenylformamidine

The intermediate ethyl (4-ethoxycarbonylphenyl) formamidate is prepared by reacting 82.6 parts (0.5 mole) of ethyl 4-aminobenzoate and 148.2 parts (1 mole) of tri-ethyl orthoformate by heating at 145° C. until about 56 parts of ethanol is collected by distillation. Excess tri-ethyl orthoformate is removed by vacuum distillation, and the residue is distilled to yield the desired formamidate intermediate.

The above prepared formamidate intermediate (11 parts, 0.05 mole) and 5.4 parts (0.05 mole) of N-methylaniline are heated at 190° C. until about 1.5 parts of ethanol are collected by distillation. The viscous yellow oil remaining in the reaction vessel is flash-distilled to yield the desired products having a boiling point of 188° C. at 0.1 mm.

EXAMPLE B-2

Preparation of N-(p-ethoxycarbonylphenyl)-N'-ethyl-N'-phenylformamidine

The procedure of Example B-1 is repeated with the exception that the formamidate intermediate is reacted with 0.05 mole of N-ethylaniline.

It is believed unnecessary to unduly lengthen the specification by including additional examples of the preparation of substituted formamidines useful in the present invention. Additional examples of the preparation of substituted formamidines characterized by Formula I are contained in U.S. Pat. No. 4,021,471, and the disclosure of said patent containing additional specific examples of the preparation of substituted formamidines characterized by Formula I is herein incorporated by reference.

As mentioned above, the substituted formamidines useful in the present invention also may be N,N'-bis-aromatic formamidines of the general formula

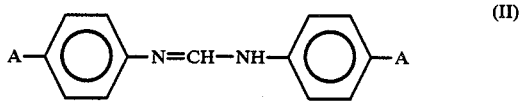

(II)

wherein A is —COOR, —COOH, —CONR'R", —NR'COR, —CN, or a phenyl group; and wherein R is an alkyl group of from one to about 8 carbon atoms; R' and R" are each independently hydrogen or lower alkyl groups of from 1 to about 4 carbon atoms.

Methods for the preparation of substituted formamidines as represented by Formula II are known in the art. For example, the formamidines of Formula II can be prepared by the reaction of about 2 molar amounts of the appropriate substituted aniline with a molar amount of an appropriate orthoformate. The reaction can be accomplished by heating the mixture, generally with the removal of alcohol as it is formed, or the reaction can be accomplished at lower temperatures by utilizing acid catalysts. Alternatively, a substituted aniline can be reacted with formic acid to form a formyl derivative (ArNCHO), which then can be condensed with a second mole of aniline or a substituted aniline in the presence of phosphorus halide (e.g., $PCl_5$), $SOCl_2$, etc. The formamidines prepared by the above techniques generally are white crystalline solids which can be recovered by crystallization from an appropriate solvent such as, for example, toluene, hexane, benzene, cyclohexane, etc.

Generally, the R groups of the ester will be a lower alkyl group containing from about 1 to about 8 carbon atoms. The R and/or R' of the amide group generally will be hydrogen or a lower alkyl containing from 1 to about 4 carbon atoms.

Specific examples of formamidines characterized by formula II are as follows:

| No. | A | Compound Name |
|---|---|---|
| B-18 | —COOH | N,N'—bis(p-carboxyphenyl)formamidine |
| B-19 | —COOMe | N,N'—bis(p-methoxycarbonylphenyl) formamidine |
| B-20 | —COOEt | N,N'—bis(p-ethoxycarbonylphenyl) formamidine |
| B-21 | —COO—n-Bu | N,N'—bis(p-n-butoxycarbonylphenyl) formamidine |
| B-22 | —COO—n-octyl | N,N'—bis(p-n-octoxycarbonylphenyl) formamidine |
| B-23 | —C≡N | N,N'—bis(p-cyanophenyl)formamidine |
| B-24 | Phenyl | N,N'—bis(p-phenylphenyl)formamidine |
| B-25 | —NHCOMe | N,N'—bis(p-acetamidophenyl)formamidine |
| B-26 | —CONH₂ | N,N'—bis(p-carbamylphenyl) formamidine |
| B-27 | —CONH—t-butyl | N,N'—bis(p-n-t-butylcarbamylphenyl) formamidine |
| B-28 | —COONa | N,N'—bis(p-carboxyphenyl)formamidine, disodium salt |
| B-29 | —CON(n-butyl)₂ | N,N'—bis(p-N—Di-n-butyl-carbamyphenyl) formamidine |

The following example illustrates the preparation of formamidines characterized by Formula II.

EXAMPLE B-23

N,N'-bis-(p-cyanophenyl)formamidine

A mixture of 10 parts (0.085 mole) of p-aminobenzonitrile and 6.2 parts (0.042 mole) of triethylorthoformate is prepared and heated at 150° C. while removing ethanol by distillation. When no additional ethanol can be recovered by distillation, the mixture is cooled, and 100 parts of ether are added. The desired product is isolated by filtration and is characterized by a melting point of 220°–221.5° C.

The procedure described in Example B-23 can be repeated at room temperature when about 0.01 part of para-toluene sulfonic acid is included in the mixture as a catalyst.

Other compounds of groups B-18 to B-29 can be prepared by similar methods by utilizing the appropriate p-substituted aniline.

Substituted formamidines of the type described above commercially available from, for example, the Givaudan Corporation, Clifton, N.J. One example is the product marketed under the trade designation "GIVSORB UV-2" which is identified as N-(p-ethoxycarbonylphenyl)-N'-ethyl-N'-phenylformamidine.

STABILIZER (3): HINDERED PHENOLIC ANTIOXIDANT COMPOUND

The dispersions of the present invention also may contain at least one hindered phenolic antioxidant compound, and these compounds may be any of the hindered phenolic antioxidants typically used to provide thermal stabilization with the least discoloration of the polymers.

In one embodiment, the hindered phenolic antioxidant compound (3) is characterized by Formula IX

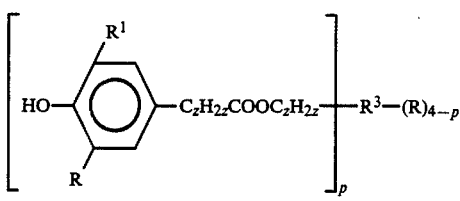

R is hydrogen or lower alkyl; $R^1$ is lower alkyl; z is an integer from 2 to about 6; p is an integer from 2 to 4; $R^3$ is a tetravalent group selected from aliphatic hydrocarbons containing from 1 to about 30 carbon atoms, aliphatic mono- and dithioethers containing from 1 to about 30 carbon atoms, and aliphatic mono- and diethers containing from 1 to about 30 carbon atoms.

The lower alkyl groups R and $R^1$ in Formula IX may contain from 1 to 8 carbon atoms and these are exemplified by methyl, ethyl, propyl, n-butyl, n-hexyl, etc. In another preferred embodiment, the group $R^3$ in Formula IX is a tetravalent group selected from aliphatic hydrocarbons containing from 1 to about 30 carbon atoms.

The following examples illustrate the hindered phenolic antioxidant compounds which are particularly useful in the present invention.

| | |
|---|---|
| Type-1 | |
| C-1 | n-Octadecyl 3-(3,5-di-t-butyl-4-hydroxyphenyl)-propionate |
| C-2 | n-Octadecyl 2-(3,5-di-t-butyl-4-hydroxyphenyl)-acetate |
| C-3 | n-Octadecyl 3,5-di-t-butyl-4-hydroxybenzoate |
| C-4 | n-Hexyl 3,5-di-t-butyl-4-hydroxyphenylbenzoate |
| C-5 | n-Dodecyl 3,5-di-t-butyl-4-hydroxyphenylbenzoate |
| C-6 | Neo-dodecyl 3-(3,5-di-t-butyl-4-hydroxyphenyl)propionate |
| C-7 | Dodecyl beta-(3,5-di-t-butyl-4-hydroxyphenyl)propionate |
| C-8 | Ethyl alpha-(4-hydroxy-3,5-di-t-butylphenyl)-isobutyrate |
| C-9 | Octadecyl alpha-(4-hydroxy-3,5-di-t-butylphenyl)isobutyrate |
| C-10 | Octadecyl alpha-(4-hydroxy-3,5-di-t-butylphenyl)propionate |
| Type-2 | |
| C-10 | 2-(n-octylthio)ethyl 3,5-di-t-butyl-4-hydroxybenzoate |
| C-11 | 2-(n-octylthio)ethyl 3,5-di-t-butyl-4-hydroxyphenylacetate |
| C-12 | 2-(n-octadecylthio)ethyl 3,5-di-t-butyl-4-hydroxyphenylacetate |
| C-13 | 2-(n-octadecylthio)ethyl 3,5-di-t-butyl-4-hydroxy benzoate |
| C-14 | 2-(2-hydroxyethylthio)ethyl 3,5-di-t-butyl-4-hydroxybenzoate |
| C-15 | Diethyl glycol bis-(3,5-di-t-butyl-4-hydroxyphenyl)propionate |
| C-16 | 2-(n-octadecylthio)ethyl 3-(3,5-di-t-butyl-4-hydroxyphenyl)propionate |
| C-17 | Stearamido N,N—bis-[ethylene 3-(3,5-di-t-butyl-4-hydroxyphenyl)propionate] |
| C-18 | n-Butylimino N,N—bis-[ethylene 3-(3,5-di-t-butyl-4-hydroxyphenyl)propionate] |
| C-19 | 2-(2-stearoyloxyethylthio)ethyl 3,5-di-t-butyl-4-hydroxybenzoate |
| C-20 | 2-(2-stearoyloxyethylthio)ethyl 7-(3-methyl-5-t-butyl-4-hydroxyphenyl)heptanoate |
| Type-3 | |
| C-21 | 1,2-propylene glycol bis-[3-(3,5-di-t-butyl-4-hydroxyphenyl)propionate] |
| C-22 | Ethylene glycol bis-[3-(3,5-di-t-butyl-4-hydroxyphenyl)propionate] |
| C-23 | Neopentylglycol bis-[3-(3,5-di-t-butyl-4-hydroxyphenyl)propionate] |
| C-24 | Ethylene glycol bis-(3,5-di-t-butyl-4-hydroxyphenylacetate) |
| C-25 | Glycerine-1-n-octadecanoate-2,3-bis-(3,5-di-t-butyl-4-hydroxyphenylacetate |
| C-26 | Pentaethylthritol-tetrakis-[3-(3',5'-di-t-butyl-4'-hydroxyphenyl)propionate] |
| C-27 | 1,1,1-trimethylol ethane-tris-3-(3,5-di-t-butyl-4-hydroxyphenyl)propionate |
| C-28 | Sorbitol hexa-[3-(3,5-di-t-butyl-4-hydroxyphenyl)propionate] |
| C-29 | 2-hydroxyethyl 7-(3-methyl-5-t-butyl-4-hydroxyphenyl)heptanoate |
| C-30 | 2-stearoyloxyethyl 7-(3-methyl-5-t-butyl-4-hydroxyphenyl)heptanoate |
| C-31 | 1,6-n-hexanediol-bis[(3',5'-di-t-butyl-4-hydroxyphenyl)-propionate] |
| C-32 | pentaerythritol-tetrakis(3,5-di-tert-butyl-4-hydroxy hydrocinnamate |

The above phenolic ester stabilizers of Types 1, 2 and 3 are more fully described in U.S. Pat. Nos. 3,330,859 and 3,644,482.

Some of the hindered phenolic antioxidant compounds of the above types are available commercially. For example, Example C-1 is available from Ciba-Geigy under the general trade designation "Irganox 1076", and the phenol of Example C-33 is available from Ciba-Geigy Company under the trade designation "Irganox 1010".

As mentioned above, other phenolic compounds normally used in the stabilization of polymer materials can be utilized as the hindered phenol antioxidant compounds in the dispersions of the present invention. A large number of different types of hindered phenol antioxidant compounds is included in U.S. Pat. No. 4,208,522 and more particularly in Cols. 3–8, and these include, for example, di-(higher)alkyl phenolic phosphonates (more fully described in U.S. Pat. No. 3,281,505) and hydroxyphenyl alkenyl isocyanurates. The disclosure of U.S. Pat. No. 4,208,522 with respect to such phenolic compounds, and particularly is found in Cols. 3–8 is herein incorporated by reference.

The pigment dispersions utilized in the present invention are prepared by mixing the pigment and glycol in a mixing vessel until a homogeneous state is obtained. When heat and/or light stabilizers are to be included in the dispersion, the order of mixing of the pigment and stabilizer components is not critical although the pigment generally is first mixed with the glycol followed by the addition of the stabilizers.

When more than one heat thermal and/or ultraviolet light stabilizer are to be included in the pigment dispersions of the present invention, the stabilizers may be premixed prior to mixing with the pigment-glycol mixture. In a preferred embodiment of the present invention, the pigment dispersions of the present invention will comprise a mixture of at least two of stabilizers (1), (2) and (3), and most preferably, all three stabilizer components are included in the pigment dispersions of the present invention. When the stabilizer components are to be included in the pigment dispersions, the relative amounts of the components are as follows: 1 to about 5 parts of stabilizer (1), 1 to about 5 parts of stabilizer (2), and 1 to about 5 parts of stabilizer (3). The amount of stabilizer included in the pigment dispersion will be an amount sufficient to provide a stabilizer content of up to about 75%, and more generally, the stabilizer content in the pigment dispersion will be from about 5 to about 40% by weight. The precise amount of the stabilizer or stabilizer mixture to be included in the pigment dispersion will be dependent upon the type and amounts of the other ingredients in the polyol component (B), and the amount of stabilizer desired to be incorporated into the final polyurethane composition. Generally, the total amount of the stabilizer components in the pigment dispersion, and the polyol component (B) of the urethane formulation should be sufficient to provide from about 0.1 to about 10% by weight of the stabilizers based on the weight of the polyurethane. It has been observed generally that larger amounts of the stabilizing components are required when treating lighter colored materials.

In the preferred embodiment of the present invention, when two or more stabilizer components are to be incorporated into the pigment dispersion, and when the individual stabilizers (1), (2) and (3) are solids and liquids, it is preferred that the solid components be mixed with the liquid components to form a solution of the stabilizers. This solution can be blended easily into the pigment dispersion.

In a preferred embodiment, a liquid solution of stabilizers (1), (2) and (3) is prepared by heating the liquid component(s) to a temperature of from about 75° F. to about 210° F. and adding and mixing the solid component(s) into the heated liquid component(s) to form a solution. In some instances, the resulting solution is maintained at an elevated temperature such as about 100° F. to about 150° F. until the solution is blended with the pigment dispersion in order to minimize crystallization. However, it has been observed if crystals are formed, they can be redissolved easily by raising the temperature of the stabilizer solution.

A specific example of the formation of a stabilizer solution by the preferred method is as follows:

Liquid Tinuvin 765 is weighed into a mixing vessel, and an immersion heater is installed. Irganox 1010 dry antioxidant is added to the liquid under agitation with the immersion heater set at 200°-210° F. Once the Irganox 1010 begins to dissolve, the solid GIVSORB UV-2 addition begins. The batch size determines the time required for complete dissolution of the particles. Usually, this occurs as the total batch temperature reaches the 200°-212° F. set point. Optimum stability of this solution is maintained by storing at about 135° F.

The following examples illustrate the preparation of the pigment dispersions, including pigment dispersions containing stabilizers, of the present invention. Unless otherwise indicated in these examples, and elsewhere in the specification and claims, all parts and percentages are by weight, and all temperatures are in degrees centigrade.

|  | Pbw |
|---|---|
| Example 1 | |
| TiO$_2$ | 65 |
| Ethylene Glycol | 35 |
| Example 2 | |
| TiO$_2$ | 60 |
| 1,2-butanediol | 40 |
| Example 3 | |
| TiO$_2$ | 65 |
| Ethylene Glycol | 34 |
| Surfactant (polyvinyl pyrrolidone K15-PVP from GAF) | 1 |
| Example 4 | |
| TiO$_2$ | 60.54 |
| Carbon Black | 0.80 |
| Iron Oxide Red | 0.03 |
| Iron Oxide Yellow | 0.61 |
| Ethylene Glycol | 38.02 |
| Example 5 | |
| TiO$_2$ | 58.13 |
| Heliogen Blue | 1.81 |
| Phthocyanine Green | 0.32 |
| Carbon Black | 0.09 |
| Ethylene Glycol | 39.65 |
| Example 6 | |
| Carbon Black | 55.0 |
| 1,2-propanediol | 45.0 |
| Example 7 | |
| TiO$_2$ | 60.0 |
| Carbon Black | 0.80 |
| Iron Oxide Red | 0.03 |
| Iron Oxide Yellow | 0.51 |
| 1,4-butanediol | 38.66 |
| Example 8 | |
| Pigment Blend of Example 1 | 72 |
| Stabilizer Blend | 28 |
| Tinuvin 765 | 40 |
| GIVSORB UV-2 | 40 |
| Irganox 1010 | 20 |
| Example 9 | |
| Pigment Blend of Example 1 | 70 |
| Stabilizer Blend | 30 |
| Tinuvin 765 | 40 |
| GIVSORB UV-2 | 60 |
| Example 10 | |
| Pigment Blend of Example 2 | 52.38 |
| Stabilizer Blend of Example 8 | 47.62 |
| Example 11 | |
| Pigment Blend of Example 3 | 55.12 |
| Stabilizer Blend of Example 8 | 44.88 |
| Example 12 | |
| Pigment Blend of Example 1 | 62.50 |
| Stabilizer Blend | 37.50 |
| Tinuvin 770 | 60 |
| GIVSORB UV-2 | 20 |
| Irganox 1076 | 20 |
| Example 13 | |
| Pigment Blend of Example 5 | 70 |
| Stabilizer Blend of Example 9 | 30 |
| Example 14 | |
| Polyester Polyol | 100.0 |
| Ethylene Glycol | 8.0 |
| Pigment/Stabilizer Blend of Example 8 | 3.5 |

As mentioned above, the above-described pigment dispersions which may contain one or more stabilizers, are blended into the polyol-containing component of two- and three-component polyurethane systems. The polyol-containing component (B) generally will contain, the backbone polyol, one or more chain extenders, one or more catalysts, and one or more blowing agents normally used in urethane systems. The backbone polyols may be any of the polyester polyols and polyether polyols well known in the urethane art. The choice of polyester or polyether polyol will depend on the particular application for which the foam will be used. Urethanes based on polyester polyols exhibit greater abrasion resistance than do urethanes derived from polyester polyols, and polyether systems are significantly lower in price than polyesters. A large number of polyether polyols and polyester polyols are available commercially from a variety of sources.

The polyol component (B) also contains one or more chain extenders which are short-chain diols such as ethylene glycol, diethylene glycol, 1,2-propanediol, 1,3-propanediol, 1,4-butanediol, and 1,6-hexanediol. The chain extenders are included in the polyol component to provide strength and, when reacted with the isocyanate component (A), forms what is referred to as the "hard block" of the polymer.

Another material included in the polyol component (B) is the catalyst. The catalyst or catalyst combinations are usually amines and/or organometallic compounds, particularly organotin compounds. THe catalysts are useful for increasing the rate of the isocyanate-polyol reaction thereby allowing the urethane systems to be processed at rapid cycle times.

The polyol-containing component (B) of the urethane system also generally contains at least one blowing agent to provide a means for expanding the liquid isocyanate-polyol mixture into a foam. The chemical blowing process uses water as a blowing agent. Carbon dioxide and polyurea are produced as a result of the reaction between isocyanate and water, the carbon dioxide bubbling through the reacting liquids thereby expanding or blowing the foam. The cells formed by the blowing agent are open-cell types and are permeable to air. This method of expanding the foam provides a more cellular skin, and most polyester systems utilize water as a blowing agent. The blowing process may also be a physical blowing process which utilizes inert, low boiling compounds, more particularly, low-boiling halogenated compounds such as Refrigerant-11, Freon, etc. blended into the reaction mixture. As the isocyanate-polyol reaction proceeds, the temperature of the mixture increases due to the exotherm, and this increase in temperature vaporizes the blowing agent forming cells within the foam. Generally, this vapor is trapped within the cells, and this process produces closed-cell foams which are impermeable to air. Inert blowing agents generally are used in polyether systems.

The preparation of the polyol-containing system (component (B)) requires very accurate mixing of four or five components. The reproducibility with which the polyol system is prepared is critical to the efficient production of quality urethane products. As mentioned above, polyol systems generally are formulated to contain pigments in order to provide the desired colors to the polyurethane foams. It is critical that the pigments incorporated into the polyol system (component (B)) be compatible with the system so that the pigments remain uniformly dispersed in the polyol system. If the pigment is not compatible with the polyol system, there is a tendency for the pigment to agglomerate and/or settle out of the polyol system which results in a number of undesirable situations including the clogging of filters resulting in an increase in down time. The quality of products also is diminished by color streaking caused by the non-homogeneity of the polyol system.

The method of the present invention provides improved compatibility of the pigments in the polyol-containing systems (component (B)) of two- and three-component polyurethane system. When predispersions of the pigments in at least one glycol are prepared as described above and thereafter blended into the polyol-containing system (component (B)), improved compatibility of the pigment with the polyol system is observed. This compatibility is particularly evident when the glycol utilized to form the pigment dispersion is the same glycol as used as the chain extender in the polyol system. Thus, for example, if the chain extender in the polyol system is ethylene glycol, the preferred glycol for the pigment dispersion is ethylene glycol. When the pigment dispersions prepared with, for example, ethylene glycol, are blended into polyol systems utilizing ethylene glycol as a chain extender, the tendency for agglomeration and settling of the pigment in the polyol system is significantly reduced as is the tendency of the system to clog the filters.

In accordance with the present invention, the compatibility of the pigment dispersion prepared in a glycol with the polyol system is further enhanced when the pigment dispersions also contain thermal and ultraviolet light stabilizers, and especially the preferred stabilizer combination of (1) hindered amine light stabilizer, (2) substitued formamidines as described above, and (3) hindered phenolic antioxidant. The enhanced stability is particularly evident when the combination of stabilizers (1), (2) and (3) are blended into the pigment dispersion as a solution of stabilizers, which solution was discussed in detail previously in the specification. In addition to the enhanced stability, it has been observed that the effectiveness of the pigment providing the desired color to the urethane system is enhanced. For example, when the pigment is a titanium dioxide pigment, and the pigment dispersion contains a liquid stabilizer solution exemplified by Example 8, it has been observed that a urethane formulation containing 10% less titanium dioxide produces a whiter product than a similar formulation containing 10% more titanium dioxide, but none of the stabilizer solutions of Example 8.

While the invention has been explained in relation to its preferred embodiments, it is to be understood that the various modifications thereof will become apparent to those skilled in the art upon reading this specification. Therefore, it is to be understood that the invention disclosed herein is intended to cover such modification as fall within the scope of the appended claims.

We claim:

1. A method for improving the compatibility of pigments in the polyol-containing component of a two-component polyurethane system comprising
   (A) preparing a dispersion comprising at least one pigment in at least one glycol, and
   (B) blending said dispersion with the polyol component.

2. The method of claim 1 wherein the dispersion comprises from about 10% to about 75% of pigment and from 25% to about 90% of glycol.

3. The method of claim 1 wherein the glycol is ethylene glycol, diethylene glycol, 1,2-propanediol, 1,3-propanediol, 1,4-butanediol, or 1,6-hexanediol.

4. The method of claim 1 wherein the glycol is ethylene glycol.

5. The method of claim 1 wherein the pigments are color pigments.

6. The method of claim 1 wherein the polyol component contains at least one polyester polyol or polyether polyol.

7. The method of claim 1 wherein the polyol component contains a polyester polyol and a glycol chain extender.

8. The method of claim 7 wherein the chain extender is ethylene glycol, diethylene glycol, 1,2-propanediol, 1,3-propanediol, 1,4-butanediol or 1,6-hexanediol.

9. The method of claim 7 wherein the glycol chain extender is ethylene glycol.

10. The method of claim 7 wherein the glycol chain extender is ethylene glycol and the glycol used to form the pigment dispersion is ethylene glycol.

11. The method of claim 1 wherein at least one heat and/or ultraviolet stabilizer is incorporated into the pigment dispersion prior to mixing with the polyol component.

12. The method of claim 11 wherein the heat and/or ultraviolet stabilizers are
(1) hindered amine light stabilizers,
(2) formamidines of the formulae

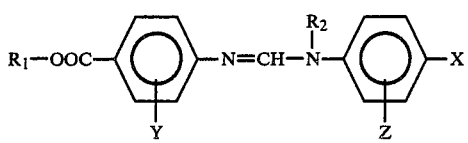

wherein $R_1$ is an alkyl group containing 1 to about 5 carbon atoms; Y is a H, OH, Cl or an alkoxy group; $R_2$ is a phenyl group or an alkyl group containing 1 to about 9 carbon atoms; X is selected from the group consisting of H, carboalkoxy, alkoxy, alkyl, dialkylamino and halogen; and Z is selected from the group consisting of H, alkoxy and halogen, or

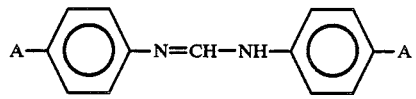

wherein A is —COOR, —COOH, —CONR'R", —NR'COR, —CN, or a phenyl group; and wherein R is an alkyl group of from one to about 8 carbon atoms; R' and R" are each independently hydrogen or lower alkyl groups of from 1 to about 4 carbon atoms, or
(3) hindered phenolic antioxidants, or mixtures of two or more of (1), (2) and (3).

13. The method of claim 12 wherein the stabilizers incorporated into the pigment dispersion comprise a mixture of (1), (2) and (3).

14. The method of claim 13 wherein stabilizer (2) is characterized by Formula I.

15. The method of claim 13 wherein the hindered amine light stabilizer (1) is characterized by the formula

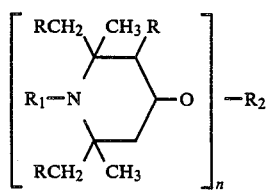

in which n is a number from 1 to 4 inclusive, preferably 1 or 2; R is hydrogen or lower alkyl; $R_1$ is hydrogen, oxyl, $C_{1-18}$ alkyl, $C_{3-8}$ alkenyl, $C_{3-8}$ alkynyl, $C_{7-12}$ aralkyl, $C_{1-8}$ alkanoyl, $C_{3-5}$ alkenoyl, glycidyl, a group —CH$_2$CH(OH)—Z wherein Z is hydrogen, methyl or phenyl, with $R_1$ preferably being hydrogen, $C_{1-12}$ alkyl, allyl, benzyl, acetyl or acryloyl; and $R_2$ when n is 1 is hydrogen, $C_{1-18}$ alkyl optionally interrupted by one or more oxygen atoms, cyanoethyl, benzyl, glycidyl, a monovalent radical of an aliphatic, cycloaliphatic, araliphatic or aromatic carboxylic acid, or a carbamic acid or of a phosphorus-containing acid, or a monovalent silyl group, preferably a group of an aliphatic carboxylic acid having 2 to 18 carbon atoms, of a cycloaliphatic carboxylic acid having 5 to 12 carbon atoms or of an aromatic carboxylic acid having 7 to 15 carbon atoms; $R_2$ when n is 2 is $C_{1-12}$ akylene, $C_{4-12}$ alkenylene, xylylene, a bivalent group of an aliphatic cycloaliphatic, araliphatic or aromatic dicarboxylic acid, of dicarbamic acid or of a phosphorus-containing acid, or a bivalent silyl group, preferably a group of an aliphatic dicarboxylic acid having 2 to 36 carbon atoms, of a cycloaliphatic or aromatic dicarboxylic acid having 8 to 14 carbon atoms, or of an aliphatic, cycloaliphatic or aromatic dicarbamic acid having 8 to 14 carbon atoms; $R_2$ when n is 3 is a trivalent group of an aliphatic, cycloaliphatic or aromatic tricarboxylic acid, of an aromatic tricarbamic acid or of a phosphorus-containing acid, or a trivalent silyl group; and $R_2$ when n is 4 is a tetravalent group of an aliphatic, cycloaliphatic or aromatic tetracarboxylic acid.

16. The method of claim 13 wherein the hindered amine light stabilizer (1) is characterized by the following formula

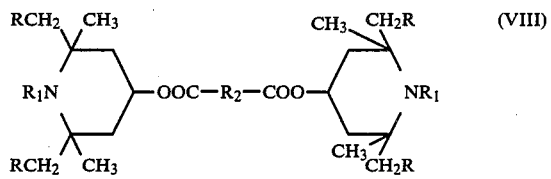

wherein $R_1$ is hydrogen or an alkyl group containing from 1 to about 12 carbon atoms; R is hydrogen or methyl; and $R_2$ is a substantially hydrocarbyl group.

17. The method of claim 13 wherein the hinered phenolic antioxidant (3) is characterized by the formula

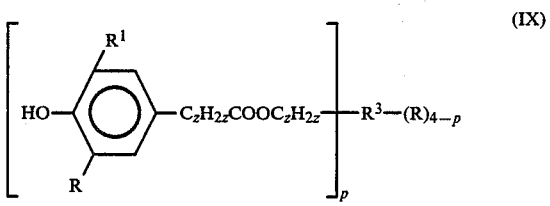

R is hydrogen or lower alkyl; $R^1$ is lower alkyl; z is an integer from 2 to about 6; p is an integer from 2 to 4; $R^3$ is a tetravalent group selected from aliphatic hydrocarbons containing from 1 to about 30 carbon atoms, aliphatic mono- and dithioethers containing from 1 to about 30 carbon atoms, and aliphatic mono- and diethers containing from 1 to about 30 carbon atoms.

18. A composition comprising at least one pigment and at least one heat and/or ultraviolet light stabilizing compound dispersed in at least one glycol.

19. The composition of claim 18 wherein the glycol is ethylene glycol, diethylene glycol, 1,2-propanediol, 1,3-propanediol, 1,4-butanediol and 1,6-hexanediol.

20. The composition of claim 18 wherein the stabilizing compounds comprise (1) at least one hindered amine light stabilizer, (2) at least one formamidine of the formulae

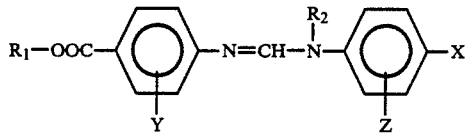

(I)

wherein $R_1$ is an alkyl group containing 1 to about 5 carbon atoms; Y is a H, OH, Cl or an alkoxy group; $R_2$ is a phenyl group or an alkyl group containing 1 to about 9 carbon atoms; X is selected from the group consisting of H, carboalkoxy, alkoxy, alkyl, dialkylamino and halogen; and Z is selected from the group consisting of H, alkoxy and halogen, or

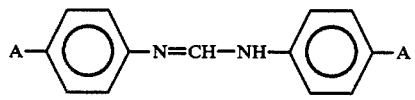

(II)

wherein A is —COOR, —COOH, —CONR'R", —NR'COR, —CN, or a phenyl group; and wherein R is an alkyl group of from one to about 8 carbon atoms; R' and R" are each independently hydrogen or lower alkyl groups of from 1 to about 4 carbon atoms, or (3) at least one hindered phenolic antioxidant compound, or mixtures of two or more of (1), (2) or (3).

21. The composition of claim 20 containing at least one of each of (1), (2) and (3).

22. The composition of claim 20 prepared by the process comprising preparing a dispersion of at least one pigment in at least one glycol and thereafter incorporating into the pigment dispersion, an ultraviolet light stabilizing mixture comprising stabilizers (1), (2) and (3).

23. A composition comprising a mixture of at least one pigment dispersed in at least one glycol, and said dispersion also containing a stabilizer mixture comprising (1) at least one hindered amine light stabilizer, (2) at least one formamidine of the formulae

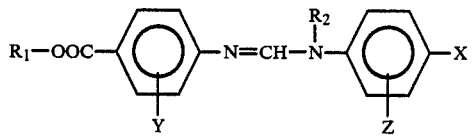

(I)

wherein $R_1$ is an alkyl group containing 1 to about 5 carbon atoms; Y is a H, OH, Cl or an alkoxy group; $R_2$ is a phenyl group or an alkyl group containing 1 to about 9 carbon atoms; X is selected from the group consisting of H, carboalkoxy, alkoxy, alkyl, dialkylamino and halogen; and Z is selected from the group consisting of H, alkoxy and halogen, or

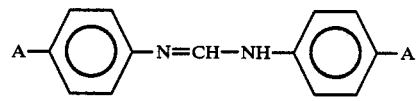

(II)

wherein A is —COOR, —COOH, —CONR'R", —NR'COR, —CN, or a phenyl group; and wherein R is an alkyl group of from one to about 8 carbon atoms; R' and R" are each independently hydrogen or lower alkyl groups of from 1 to about 4 carbon atoms, and (3) at least one hindered phenolic antioxidant compound.

24. The composition of claim 23 wherein component (2) is characterized by Formula I.

25. The composition of claim 23 wherein the stabilizing mixture comprises, on a weight basis, from 1 to about 5 parts of (1), from 1 to about 5 parts of (2), and from 1 to about 5 parts of (3).

26. The composition of claim 23 wherein the glycol is ethylene glycol.

* * * * *